(12) United States Patent
Kawaguchi

(10) Patent No.: US 6,754,803 B1
(45) Date of Patent: Jun. 22, 2004

(54) MULTIPROCESSOR SYSTEM AND ADDRESS SOLUTION METHOD OF THE SAME

(75) Inventor: Shinichi Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 718 days.

(21) Appl. No.: 09/667,250

(22) Filed: Sep. 22, 2000

(30) Foreign Application Priority Data

Nov. 24, 1999 (JP) .......................................... 11/333489

(51) Int. Cl.$^7$ .......................................... G06F 12/00
(52) U.S. Cl. ........................... 712/14; 712/32; 709/216
(58) Field of Search .............................. 712/14, 13, 28, 712/32, 225, 10, 11, 12; 711/114, 144, 148, 153, 200, 205, 221; 709/214, 220, 245, 215, 216

(56) References Cited

U.S. PATENT DOCUMENTS

| | | | | |
|---|---|---|---|---|
| 5,535,338 A | * | 7/1996 | Krause et al. ............... | 709/222 |
| 5,537,403 A | * | 7/1996 | Cloonan et al. ............. | 370/352 |
| 5,590,285 A | * | 12/1996 | Krause et al. ............... | 709/218 |
| 5,960,461 A | * | 9/1999 | Frank et al. ................. | 711/163 |
| 6,085,233 A | * | 7/2000 | Jeffrey et al. ............... | 709/216 |
| 6,351,798 B1 | * | 2/2002 | Aono ........................... | 712/11 |
| 6,604,136 B1 | * | 8/2003 | Chang et al. ................ | 709/223 |

FOREIGN PATENT DOCUMENTS

JP        2000-3341        1/2000

* cited by examiner

Primary Examiner—Henry W. H. Tsai
(74) Attorney, Agent, or Firm—Young & Thompson

(57) ABSTRACT

In a distributed shared memory type multiprocessor system, even a cell, which has no address solution mechanism, can be used as a constitutional component, so that the multiprocessor system can be flexibly operated by the various memory-constitutions. A network 500 has address solution mechanisms corresponding to the respective cells 400 and input/output controlling apparatuses 600. Each address solution mechanisms is retrieved by an address given from the cell 400 or input/output controlling apparatus 600 so as to output which memory module of a cell the address corresponds to.

13 Claims, 18 Drawing Sheets

NODE#0

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 1 | 2 | 3 | 3 | 3 | 3 | - | - | - | - | - | - | - | - | - |
| 0 | 0 | 0 | 0 | 1 | 2 | 3 | - | - | - | - | - | - | - | - | - |
| 1 | 1 | 1 | 1 | 1 | 1 | 1 | 0 | 0 | 0 | 0 | 0 | 0 | 0 | 0 | 0 |

NODE#1

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 1 | 2 | 3 | 3 | 3 | 3 | - | - | - | - | - | - | - | - | - |
| 1 | 1 | 1 | 0 | 1 | 2 | 3 | - | - | - | - | - | - | - | - | - |
| 1 | 1 | 1 | 1 | 1 | 1 | 1 | 0 | 0 | 0 | 0 | 0 | 0 | 0 | 0 | 0 |

NODE#2

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 1 | 2 | 3 | 3 | 3 | 3 | - | - | - | - | - | - | - | - | - |
| 2 | 2 | 2 | 0 | 1 | 2 | 3 | - | - | - | - | - | - | - | - | - |
| 1 | 1 | 1 | 1 | 1 | 1 | 1 | 0 | 0 | 0 | 0 | 0 | 0 | 0 | 0 | 0 |

NODE#3

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 1 | 2 | 3 | 3 | 3 | 3 | - | - | - | - | - | - | - | - | - |
| 3 | 3 | 3 | 0 | 1 | 2 | 3 | - | - | - | - | - | - | - | - | - |
| 1 | 1 | 1 | 1 | 1 | 1 | 1 | 0 | 0 | 0 | 0 | 0 | 0 | 0 | 0 | 0 |

Fig. 13

INPUT/OUTPUT CONTROLLING APPARATUS %0

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | 1 | 1 | 1 | 1 | 1 | 1 | 1 | 0 | 0 | 0 | 0 | 0 | 0 | 0 | 0 | 0 |
| | 0 | 0 | 0 | 0 | 1 | 1 | 1 | 1 | – | – | – | – | – | – | – | – |
| | 0 | 1 | 2 | 3 | 0 | 1 | 2 | 3 | – | – | – | – | – | – | – | – |

INPUT/OUTPUT CONTROLLING APPARATUS %1

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | 1 | 1 | 1 | 1 | 0 | 0 | 0 | 0 | 0 | 0 | 0 | 0 | 0 | 0 | 0 | 0 |
| | 2 | 2 | 2 | 2 | – | – | – | – | – | – | – | – | – | – | – | – |
| | 0 | 1 | 2 | 3 | – | – | – | – | – | – | – | – | – | – | – | – |

INPUT/OUTPUT CONTROLLING APPARATUS %2

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | 1 | 1 | 1 | 1 | 0 | 0 | 0 | 0 | 0 | 0 | 0 | 0 | 0 | 0 | 0 | 0 |
| | 3 | 3 | 3 | 3 | – | – | – | – | – | – | – | – | – | – | – | – |
| | 0 | 1 | 2 | 3 | – | – | – | – | – | – | – | – | – | – | – | – | ate architecture and its address solution method.
MULTIPROCESSOR SYSTEM AND ADDRESS SOLUTION METHOD OF THE SAME

BACKGROUND OF THE INVENTION

1. Field of the Invention

The present invention relates to a multiprocessor system and address solution method thereof, more particularly to a multiprocessor system having distributed shared memory type architecture and its address solution method.

2. Description of the Related Art

A distributed shared memory architecture where memories are distributed and arranged in the vicinity of processors has a feature in which an access to a local memory is made at high speed as compared with a system in which all memories are intensively arranged. On the other hand, in the case where the memories placed at the different physical positions are set in a single memory space in the distributed shared memory constitution, determination is made as to whether a memory access is to a local memory access or to a remote memory access. If it is to the remote memory, the need for transfer arises. For this reason, some means for solving the address (for example, an address conversion table) is needed.

Moreover, in the system of the typical distributed shared memory constitution, a method for constituting a large scale system is often adopted in which a plurality of constitutional units (hereinafter referred to as a cell) including a processor, a memory and other computer primary constitutional components is packaged and these cells are interconnected by a network. In this case, implementation in which the respective cells are separated and each cell is operated as an independent computer can be relatively easily made. Such a separation is called partitioning, and the separated cell in this case is particularly referred to as a partition. If such a constitution is accepted, it brings about improvements in which a large-scale system can be easily implemented as compared with the intensive memory type system.

On the other hand, in a computer of a large-scale symmetric multiprocessor in which the memories are shared by the large number of processors, there is difficulty in increasing performance (improvement of scalability) in proportion to the number of processors because of limitation on software and competition for resources. Also, there is a physical limitation in increasing the number of processors. For this reason, there is a case where means for interconnecting a plurality of computers to implement large-scale processing ability is adopted. Such a system is called a cluster system. Each independent computer is particularly referred to as a node. The cluster system brings about not only a breakthrough of the limitation of system scale but also the availability. Namely, the plurality of computers is independently operated so as to prevent trouble and crush occurred at one portion from extending through the entire system. For this reason, the cluster system is often used to implement a system of high reliability.

However, the above-described cluster system has problems that setup and management become complicated and additional cost relating to the housing and interconnection cable is required. For this reason, there has come on the market the so-called inner housing cluster system where a plurality of small sized computers is put into one housing and necessary interconnection is made in the housing, and setup and testing are finished before shipment. However, in the existing cluster system including the above product, since a network is used to interconnect the computers, the communication overhead becomes large and there has been difficulty in improving performance in proportion to an increase in the number of nodes.

On the other hand, in the large-scale single computer system, there is a case where effect of improvement in performance cannot be easily obtained depending on the content of processing even if the number of processors is increased. Additionally, there has been a problem where a single failure and trouble easily extended through the entire system.

To solve the above problems, in Japanese published unexamined Patent Application No. 10-166723, as shown in FIG. 17, an address solution table is provided in each cell controlling circuit, so that the distributed shared system can be operated as a symmetric type multiprocessor and one system can be operated as a cluster system. This makes it possible to operate the same distributed shared memory architecture system selectively as a single symmetric shared memory computer and an inner housing cluster system.

However, in the above prior art, it is necessary to package address solution tables into all cells to be loaded, and there is a problem that the cell, which has no address solution table for the cluster function packaged thereon, cannot be loaded in the case of using the cluster constitution.

Additionally, since each cell is an independent computer and at the same time a node constitutional component, an input/output controlling apparatus is also loaded on the cell as shown in FIG. 18. Therefore, since the number of input/output controlling apparatuses, which is mounted on the cell constituting the node, is the upper limit of the number of input/output controlling apparatuses belonging to each node, there is a problem in which the performance of input/output processing cannot be implemented more than the number of input/output controlling apparatuses in one node. In this case, even if the input/output controlling apparatus is provided to the outer portion of cell, the cluster constitution cannot be obtained unless the address solution table is packaged in the input/output controlling apparatus itself.

Moreover, for example, as shown in FIG. 15, in the constitution where the cell has the input/output controlling apparatus, if a problem occurs in a cell of a certain node during the operation of cluster constitution, separating the cell produces the effect that the input/output controlling apparatus cannot be used even if the input/output controlling apparatus is normal.

SUMMARY OF THE INVENTION

The object of the present invention is to enable a cell, which has no address solution table for cluster function mounted thereon, to be operated as a node structural component and the same distributed shared memory architecture system can be selectively operated as a single symmetric multiprocessor computer or as an inner housing cluster system. By this operation, without depending on the function of a cell, a flexible computer system can be provided where the problems of both systems are solved according to the content of processing and the advantages of each system can be obtained.

Moreover, the object of the present invention is to make an operation as a cluster system possible even if the input/output controlling apparatus, which has no address solution table thereon, is connected thereto, and to perform assignment of the connected input/output controlling apparatus to each node flexibly.

In order to solve the above problems, the present invention provides a multiprocessor system, which is constituted by connecting a plurality of cells, comprises a network, at least one processor and a memory, wherein the network determines which memory of a cell an address specified by one of the plurality of cells indicates.

BRIEF DESCRIPTION OF THE DRAWINGS

The above and other objects, features and advantages of the present invention will become more apparent upon a reading of the following detailed description taken in conjunction with the accompanying drawings, in which:

FIG. 6 is an example of setting an address solution table for implementing a first example of a memory constitution;

FIG. 8 is an example of setting an address solution table for implementing a second example;

FIG. 13 is an example of setting an address solution table for implementing a third example;

DESCRIPTION OF THE PREFERRED EMBODIMENTS

Figure 1:
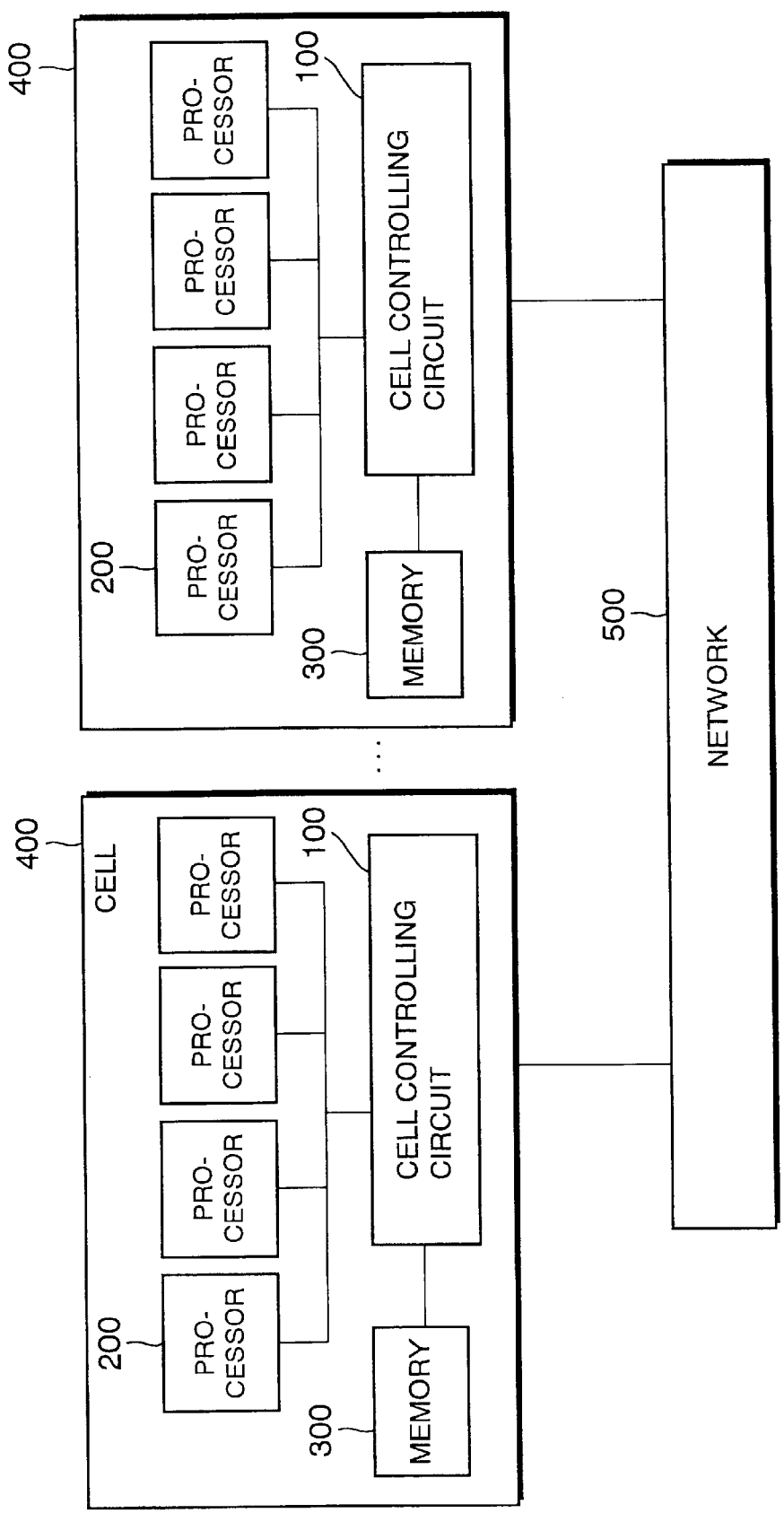
FIG. 1 is a block diagram showing the constitution of one embodiment of the multiprocessor system of the present invention.

Referring to FIG. 1, an embodiment of a multiprocessor system of the present invention is constituted by interconnecting a plurality of cells 400 to a network 500. Suppose that this system has four cells 400, and that each cell 400 has four processors 200, a memory 300, and a cell control circuit 100. However, the number of components can be arbitrarily set in accordance with requirements system.

Thus, a computer system of a constitution is called a distributed shared memory architecture from a physical aspect, where the memory exists in each cell and a distance between a particular processor and a memory existing within a single cell (intra-cell access) is different from a distance between a processor and a memory existing in separate cells (inter-cell access). Additionally, this is also called uneven memory access architecture from a time aspect since the memory access latency of the intra-cell access is different from that of the inter-cell access.

Figure 2A:
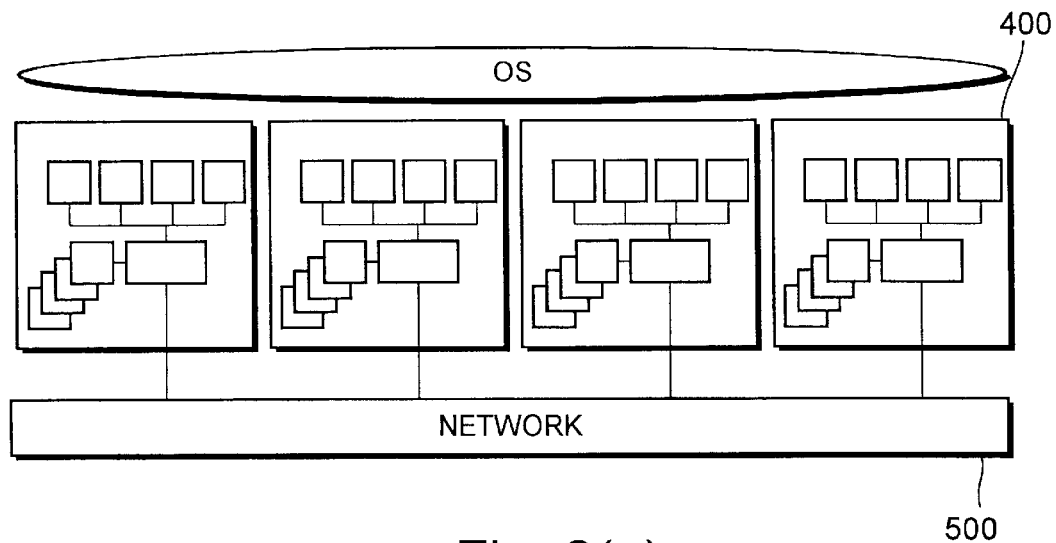
FIGS. 2(a) and (b) are views showing the corresponding relationship between an address space and software.

However, even in the system of the above distributed o shared memory architecture, with respect to software running on the system, distributed memories can be presented as if they exclusively existed at one location to facilitate the package of software itself. Namely, even in the distributed shared memory architecture, it is possible to present the above system as a symmetric type multiprocessing system with respect to software as shown in FIG. 2(a). Therefore, the system, which has the present topology, can be also considered as one formation of the symmetric type multiprocessing system.

Figure 2B:
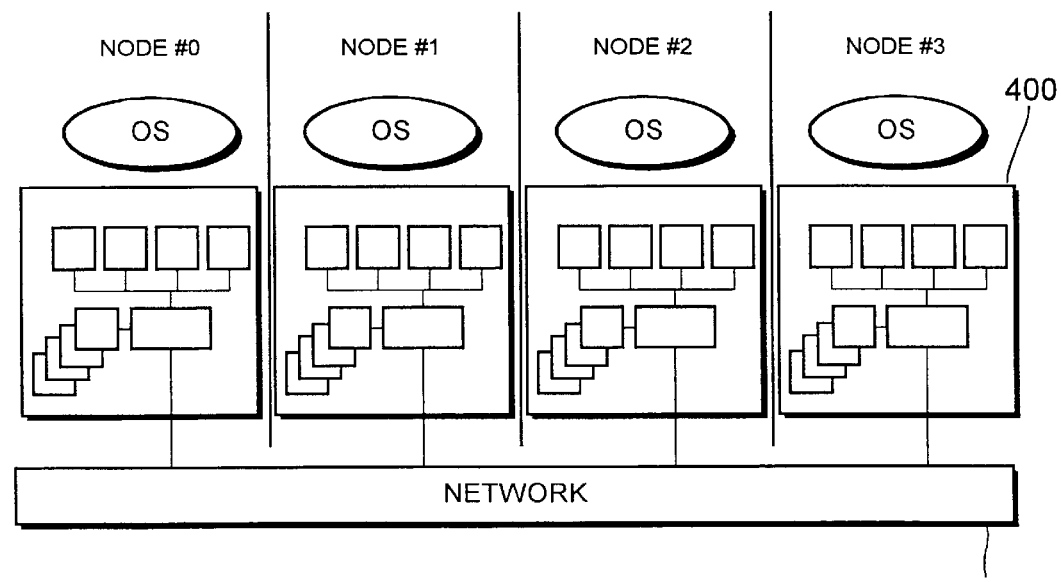

Moreover, in such a large-scale computer system, there is a case where the system is divided by function and is operated as a gathering of a plurality of small-scale computers (partitions) as shown in FIG. 2(b) in addition to the case where the entire system is operated as one computer as shown in FIG. 2(a). Furthermore, there is an operation method wherein such a portioned small-scale computer is used as one node, and a weak connection between the nodes is established as keeping independence of each node, thus constituting a cluster in one system. In this case, weakening associativity of the connection between the nodes prevents an error generated in one node from being propagated to the other node.

Figure 3:
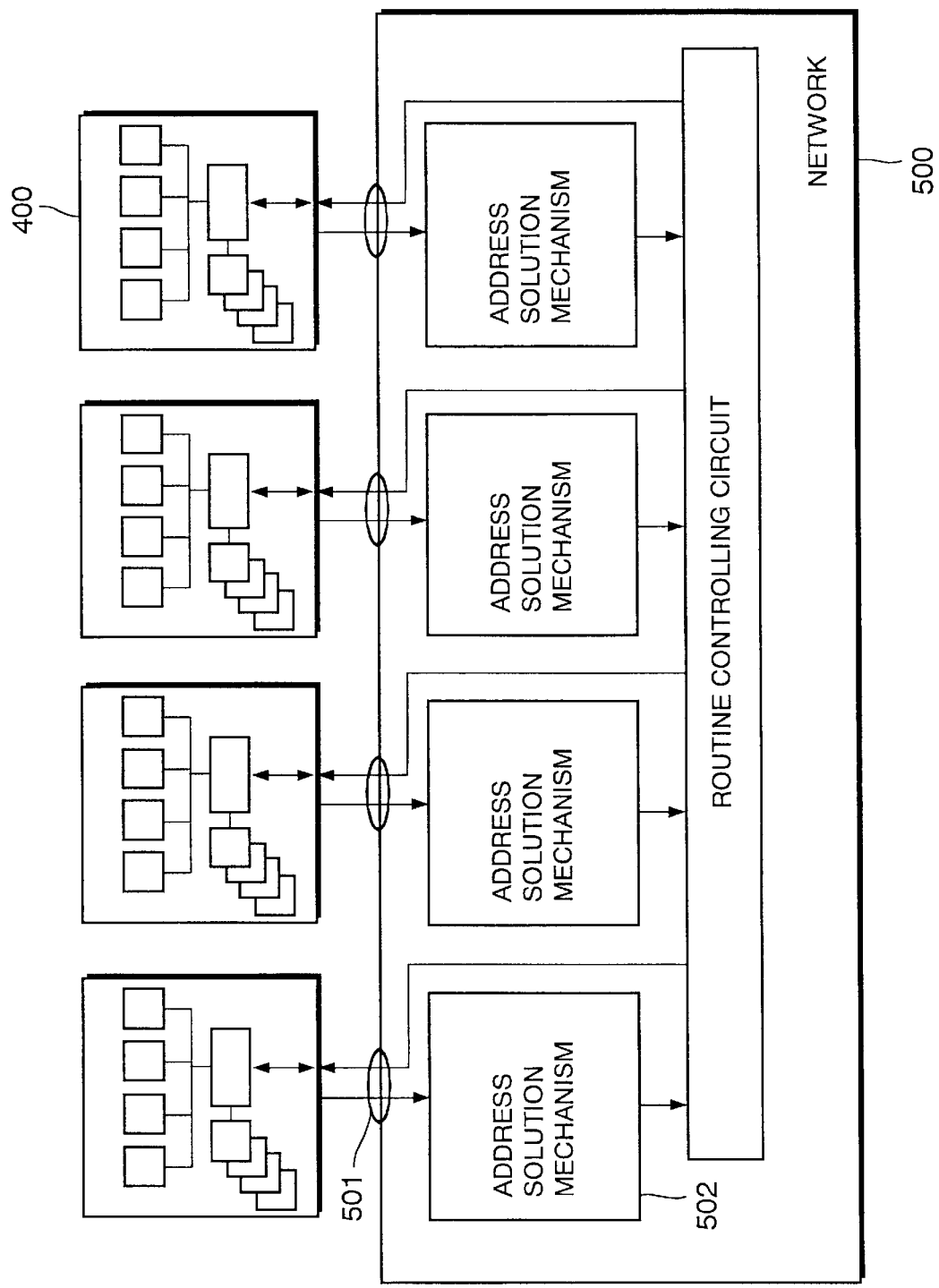
FIG. 3 is a view showing the relationship between a network and cells.

Referring to FIG. 3, in the multiprocessor system of the present invention, the network 500, which performs interconnection between cells 400, has four ports 501, and each port 501 is connected to corresponding cell 400. The network 500 has address solution mechanisms 502, corresponding to the respective ports 501. By this address solution mechanism 502, the address of the memory in each cell 400 is viewed as a single memory space without overlap. An access request to the memory 300 from the processor 200 is sent to network 500 to determine a physical cell number of the memory 300 where access is requested from the processor 200. A routine control circuit 580 connects the address solution mechanisms 502 to each other.

Figure 4:
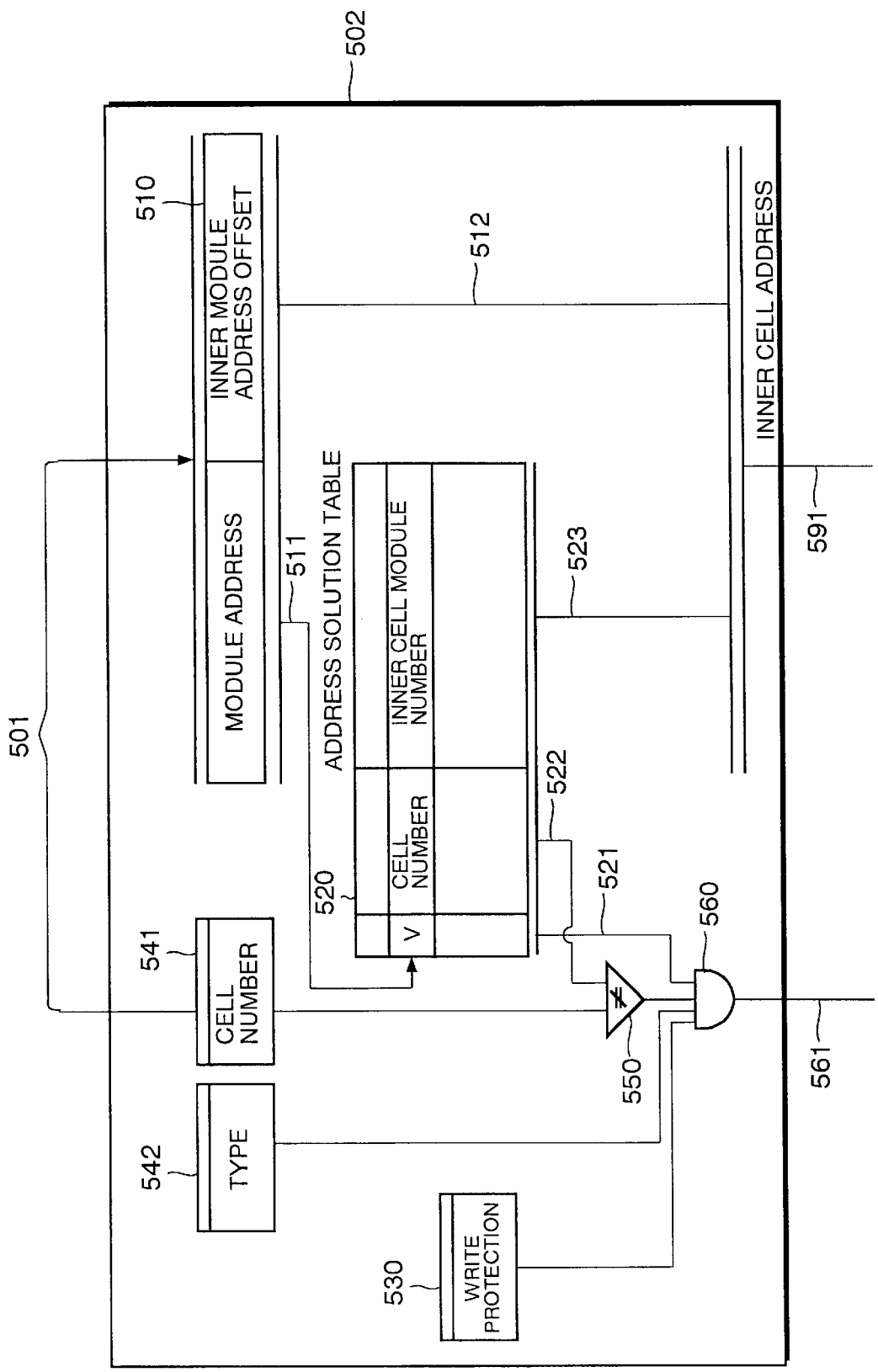
FIG. 4 is a view showing the constitution of an address solution mechanism.
Figure 5:
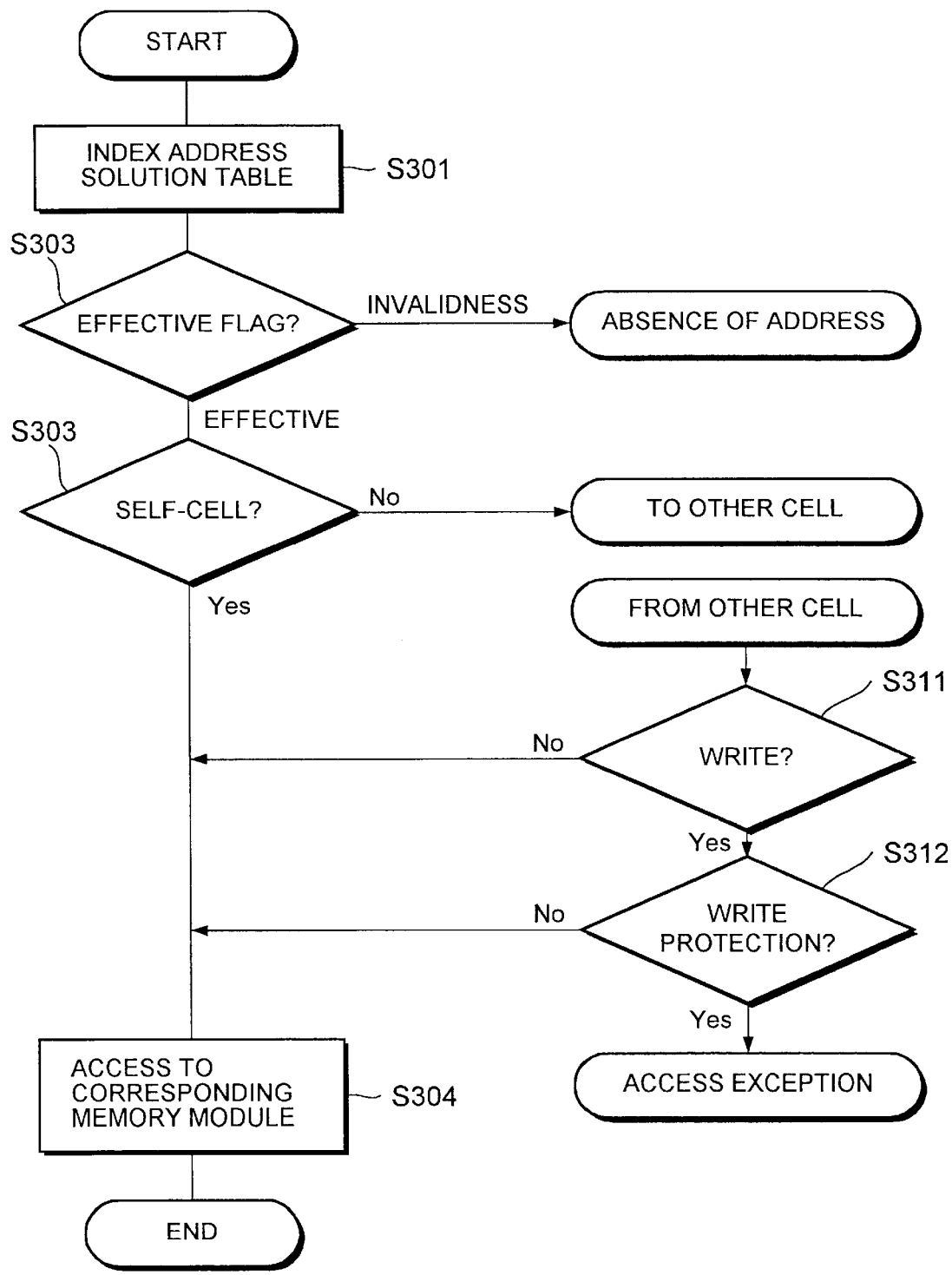
FIG. 5 is a flowchart explaining an operation of the present invention.

Referring to FIG. 4, each address solution mechanism 502 of the network 500 includes an address register 510, the address solution table 520, a write protection flag 530, a cell number register 541, an access type register 542, a comparator 550, and an AND circuit 560.

The address solution table 520 is initialized at the time of system startup. This address solution table 520 represents the memory 300, which exists in each cell in the distributed manner, in a single memory space without overlap of address. The address solution table 520 correlates the memory address requested by the processor to a physical cell. The address solution table 520 has a plurality of entries, and is retrieved by a module address 511 in the address from the port 501. Each entry holds a valid bit 521, a cell number 522 and an inner cell module number 523. The valid bit 521 indicates whether or not the entry is valid. For example, "0" may mean the entry is invalid, and "1" may mean the entry is valid. The cell number 522 identifies the number of cell in which the memory module, equivalent to the address, exists. The inner cell module number 523 determines which memory 300 of the cell corresponds to the address. The inner cell module number 523 and an inner module address offset 512 are connected to each other so as to form an inner cell address 591.

If an inter-cell access is a write access, the write protection flag 530 determines whether or not the write access should be permitted. For example, if the write protection flag 530 is "0", the write from the other cell is permitted, and if the write protection flag 530 is "1", the write from the other cell is not permitted and is regarded as an access exception.

The cell number register 541 stores the cell number of the cell where the requesting processor exists. The access type register 542 shows the type of access request. For example, in the case of "1", it means the request is a write access. The comparator 550 compares the content of the cell number register 541 with the cell number 522 read from the address solution table 520. The AND circuit 560 outputs an access exception generating signal 561 when the valid bit 521 of address solution table 520 indicates validity, the access type is the write, the write protection flag 530 does not, permit inter-cell write access, and the cell number 522 read from the address solution table 520 does not match the value of the cell number register 541, indicating an inter-cell access. This makes it possible to improve independence between nodes in the cluster constitution and to prevent the error propagation.

An operation of the embodiment of the present invention will be described with reference to the drawings.

Referring to FIG. 1 to FIG. 5, when there is memory access from the processor 200, the access is sent to the address solution mechanism 502 of the network 500 corresponding to the cell of the requesting processor 200. The address solution mechanism 502 indexes the address solution table 520 by use of the module address 511 (step S301 in FIG. 5). As a result, if the valid bit 521 indicates invalidity (step S302), it is regarded that the access is made to a non-existent address, and an address absence exception signal is generated. Moreover, if it is shown that the access is made to memory located in a different cell (step S303), the access is transferred to the other cell through the routine control circuit 580. Furthermore, if the access is intra-cell, access to the corresponding memory module in the same-cell is made (step S303).

Moreover, in the case of an inter-cell access, if the access is not a write (step S311), access to the corresponding memory module is made in the same way as the case of the intra-cell access (step S304). On the other hand, if an inter-cell access is a write access, the write protection flag 530 is checked (step S312). Then, if the write protection flag 530 indicates the permission of the inter-cell write, access to the corresponding memory module is made (step S303), and, if the write protection flag 530 indicates that the inter-cell write access is not permitted, an access exception is detected.

Next, a description is given of an example of the memory constitution according to the embodiment of the present invention.

Figure 6:
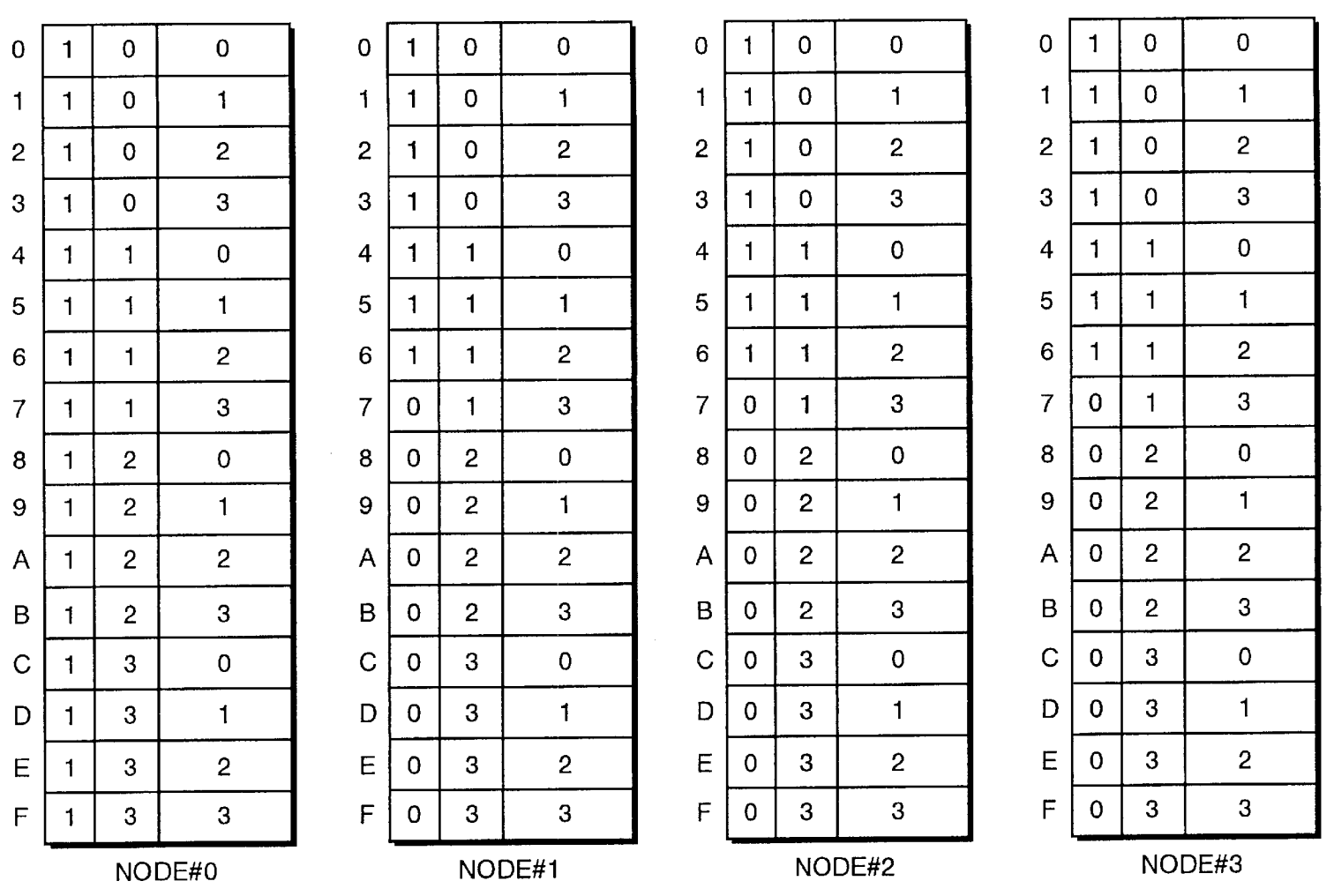
Figure 7:
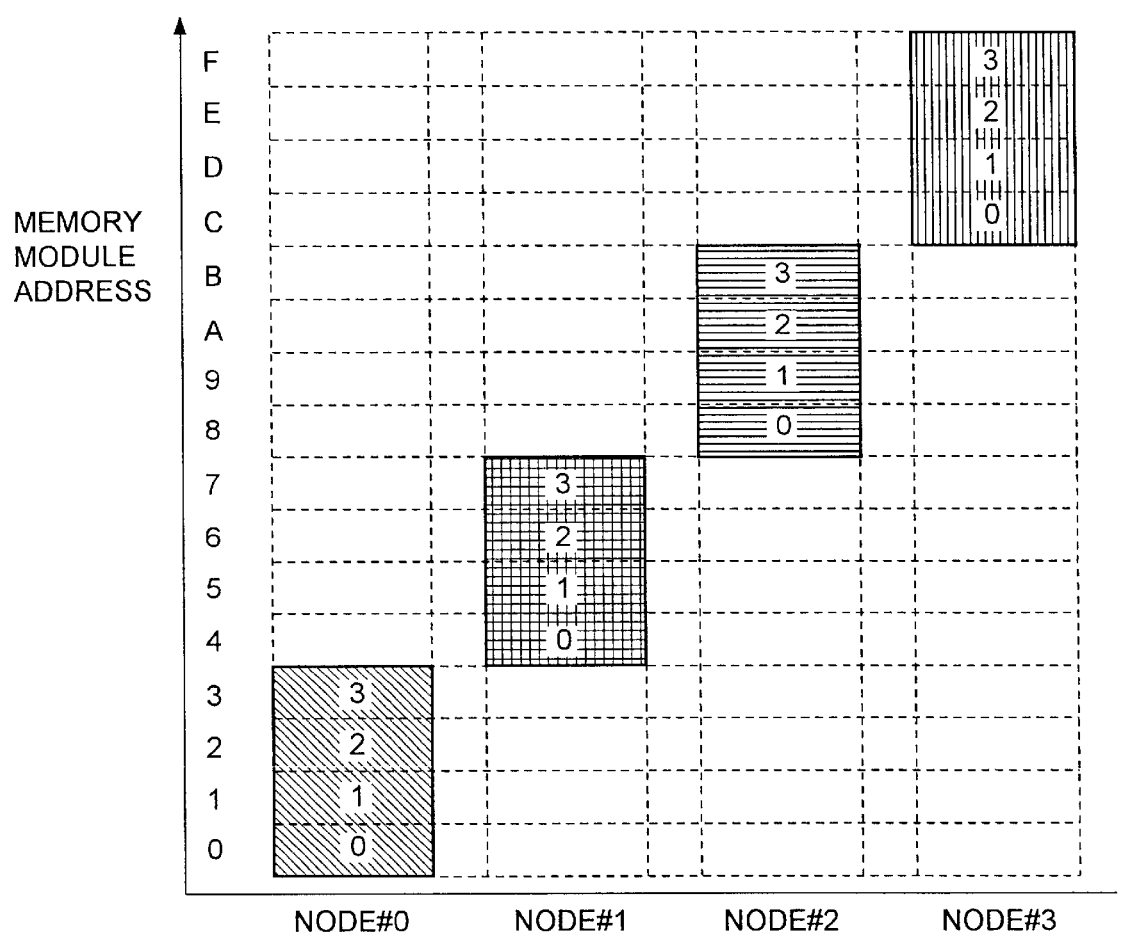
FIG. 7 is a view showing a memory map of the first example of the memory constitution.

In the case where the address solution table 520 corresponding to each of nodes #0 to #3 is set as shown in FIG. 6, the memory constitution of FIG. 7 is implemented. In FIG. 7, the solid line portions denote memories, which are physically mounted on the respective nodes. Here, it is assumed that all nodes have the same number of memories, but this may not be the same in an actual implementation. Moreover, a vertical axis shows a memory address seen from each node, and it is assumed that all nodes have a space starting address "0". It is noted that address "0" is drawn at the top portion in each table of FIG. 6, while address "0" is placed at the lowest portion according to the general case in FIG. 7.

This example of the memory constitution of FIG. 6 imitates the symmetric type multiprocessor. The memories of each node are piled up in order of address from node #0 so as to be reconstituted as one memory space that has a capacity corresponding to 16 modules as a whole. Then, all memories are accessed from all nodes in the same way.

Figure 9:
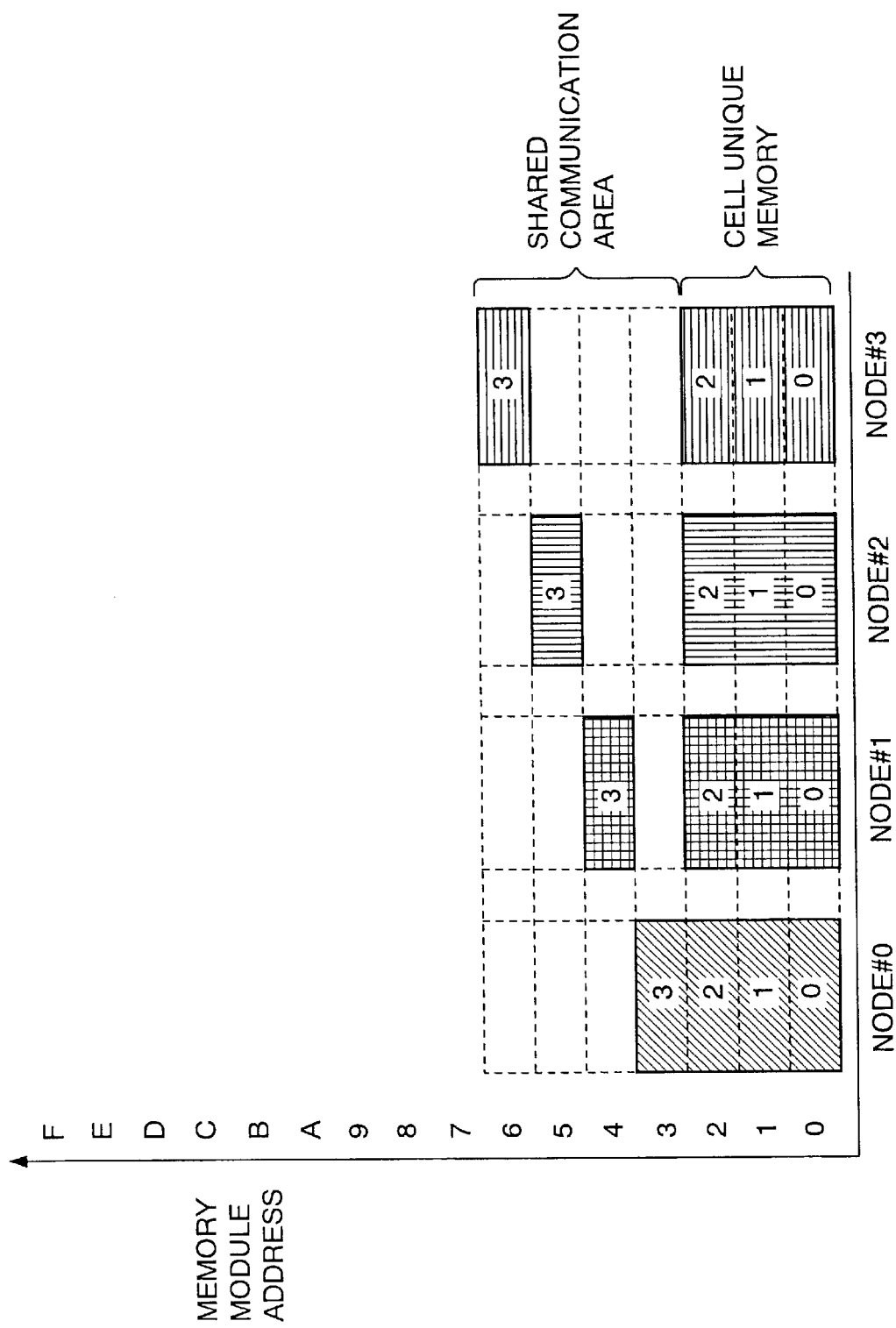
FIG. 9 is a view showing a memory map of the second example.
Figure 10:
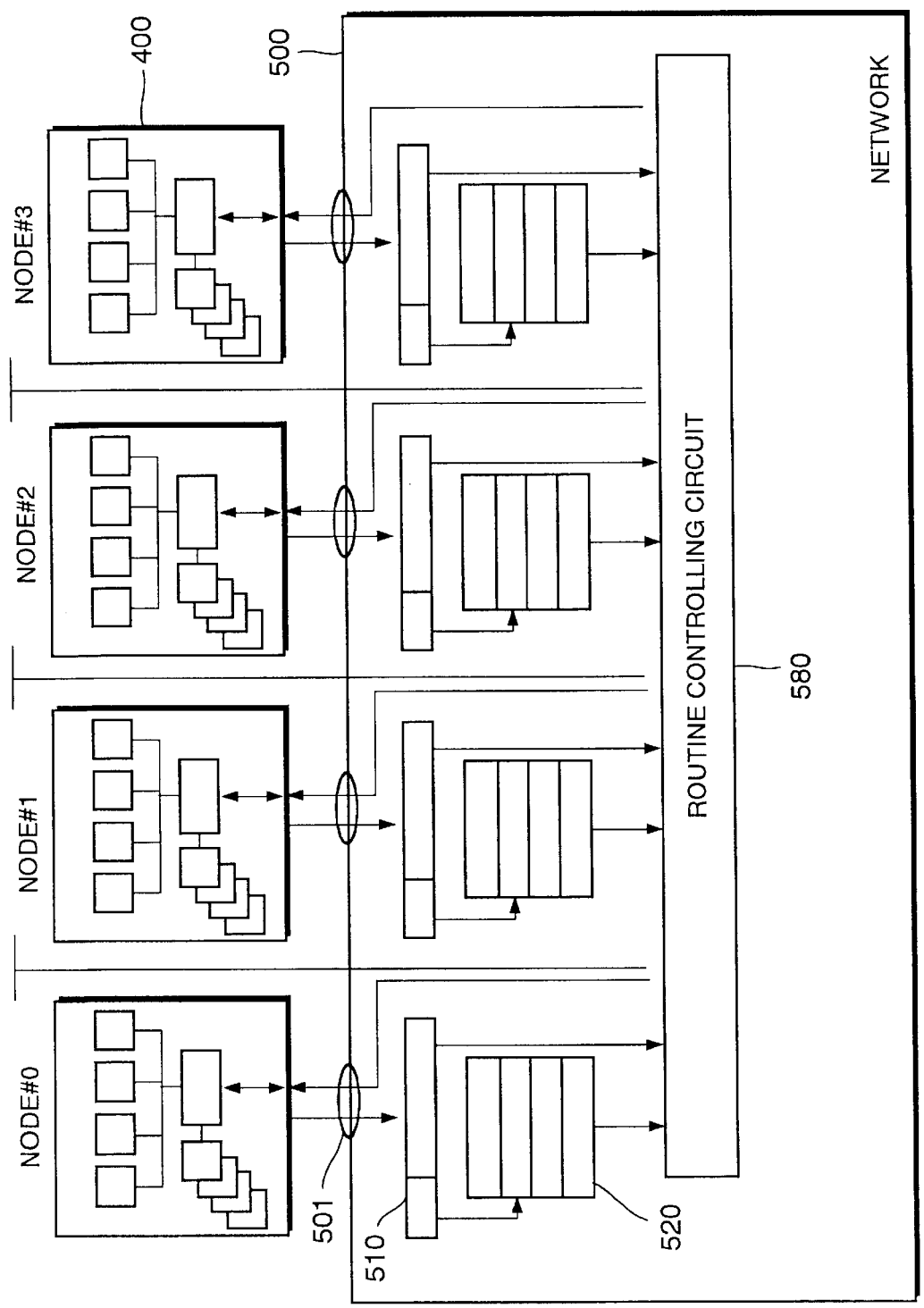
FIG. 10 is a view showing assignment of node in the second example.

In the case where the address solution table 520 corresponding to each of nodes #0 to #3 is set as shown in FIG. 8, the memory constitution of FIG. 9 is implemented. According to this memory constitution, the cluster operation as shown in FIG. 10 can be executed. In this example, module addresses x 0 to x 2 of each node are mapped to the local memories of each node and they are independent of one another (cell unique memory). On the other hand, module addresses x 3 to x 6 are combined such that the memory modules of each cell have a different address, and a mutual access by a common address is possible (shared communication area). In this example, a half or more of a logical address space of each node is a shared space, but this is because the memories of each cell are set to four module constitution for the sake of convenience. A ratio of the shared area to the unique area can be made smaller than this embodiment in practice.

A second embodiment of the multiprocessor system of the present invention will be described with reference to the drawings.

Figure 11:
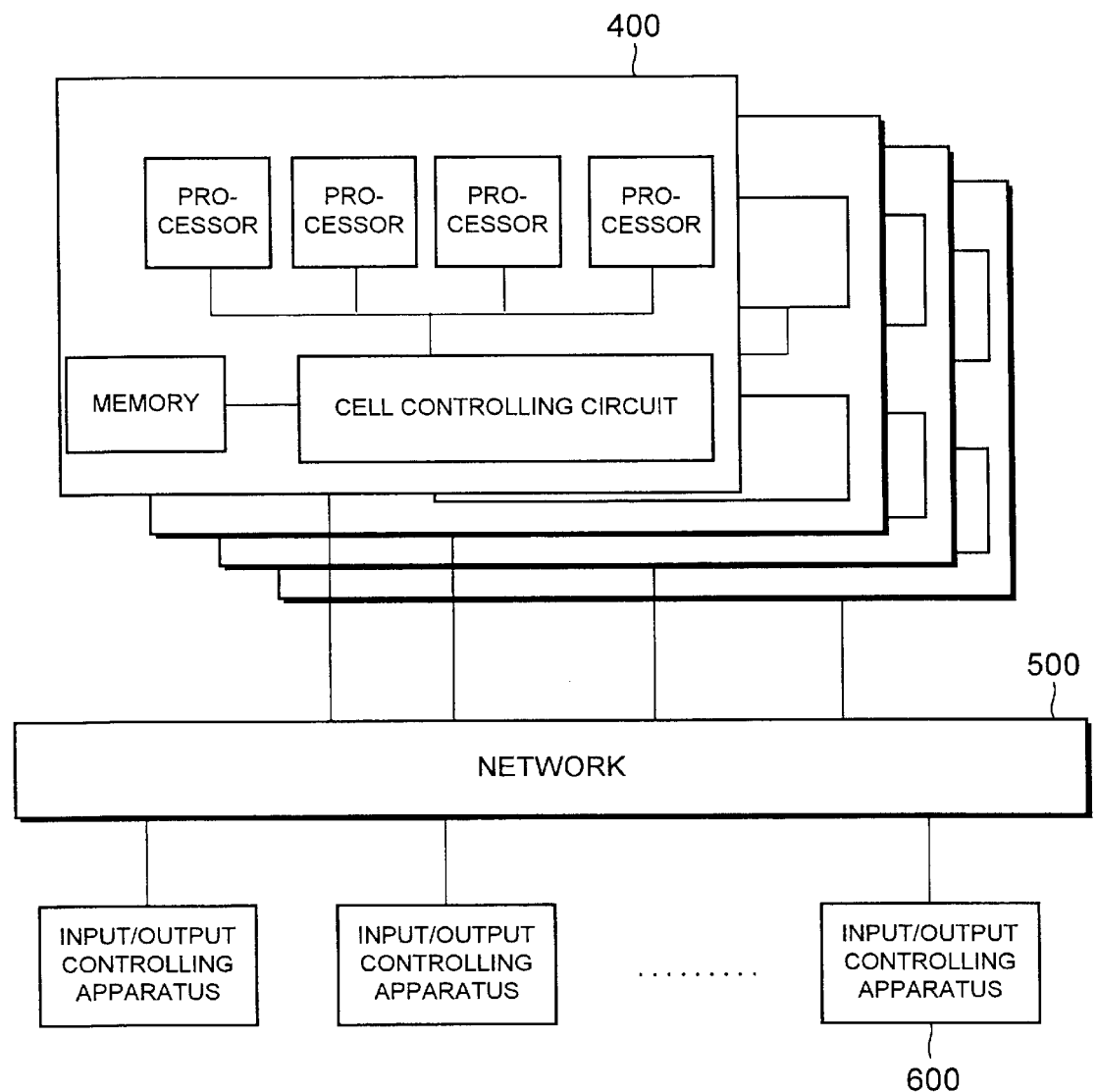
FIG. 11 is a block diagram showing the constitution of the second embodiment.

Referring to FIG. 11, a plurality of input/output controlling apparatuses 600 that control an input/output apparatus (not shown) is connected to the network 500. In order to constitute the partition or cluster in this constitution, it is necessary to assign each input/output controlling apparatus 600 to one partition or node. In other words, it is necessary for each input/output controlling apparatus 600 to view only the memory address space of the node to which the apparatus belongs.

Figure 12:
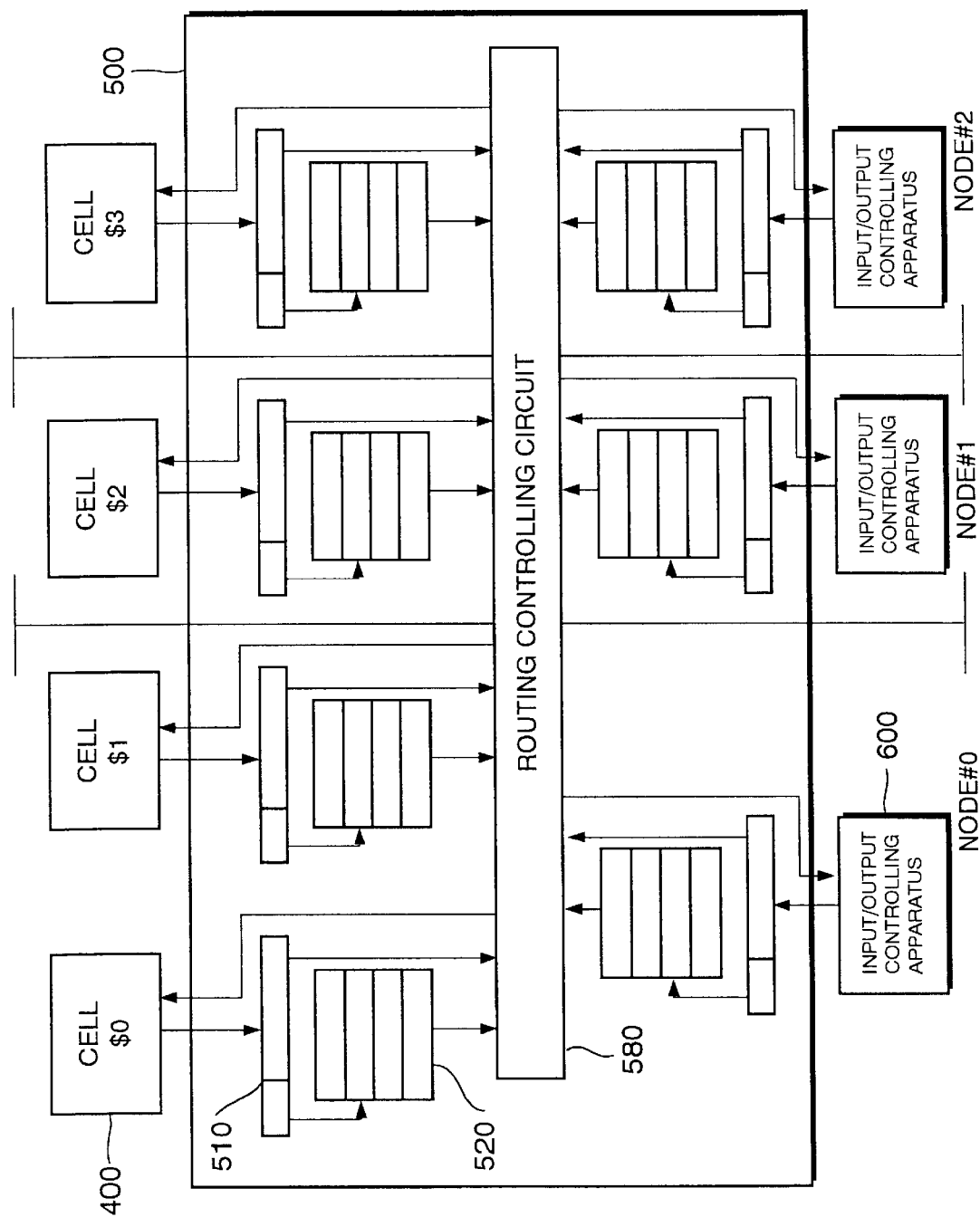
FIG. 12 is a view showing the relationship among a network, cells, and input/output controlling apparatuses.

Referring to FIG. 12, for example, three input/output controlling apparatuses 600 are connected to the network 500. Then, among three input/output controlling apparatuses 600, an input/output controlling apparatuses %0 is assigned to node #0, %1 is assigned to node #1, and %2 is assigned to node #2. In this case, in the port portion of each input/output controlling apparatus 600, there exists the address solution table including memory address space information of the node to which each input/output controlling apparatus 600 belongs. This address solution table is searched with respect to the memory access requested from the input/output controlling apparatus 600, the physical cell number of the memory becomes clear, to which the input/output controlling apparatus 600 requests access. Moreover, by preventing physical address information other than that of its own node from being added to this address solution table, it is possible for each input/output controlling apparatus 600 to view only the physical address of its own node.

Figure 14:
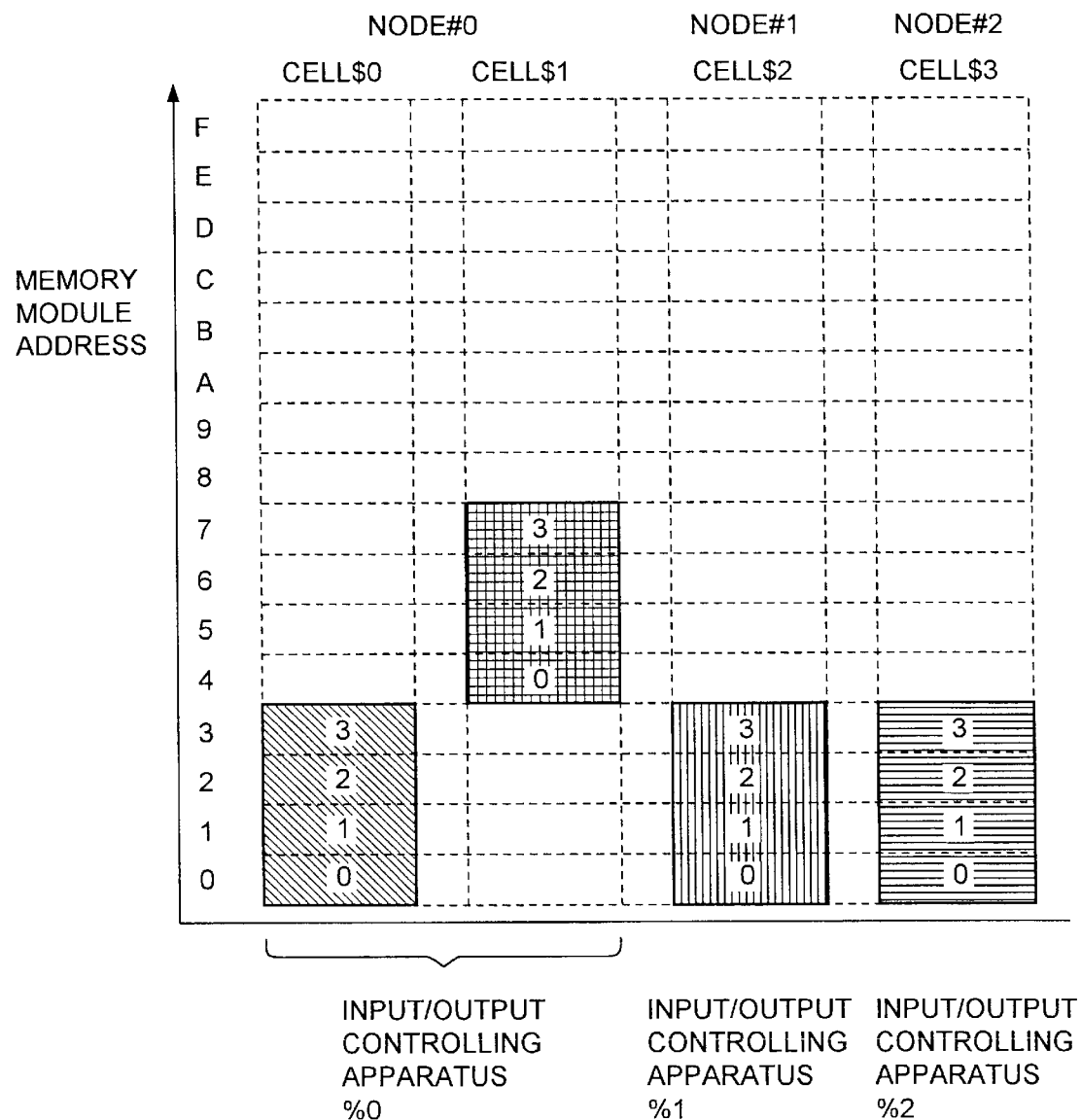
FIG. 14 is a view showing a memory map of the third example.

If the address solution table 520 corresponding to each of %0, %1, %2 of the input/output controlling apparatuses 600 is set as shown in FIG. 13, the memory constitution of FIG. 14 is implemented. According to this memory constitution, it is possible to reserve an independent input/output space in each input/output controlling apparatus 600.

Figure 15:
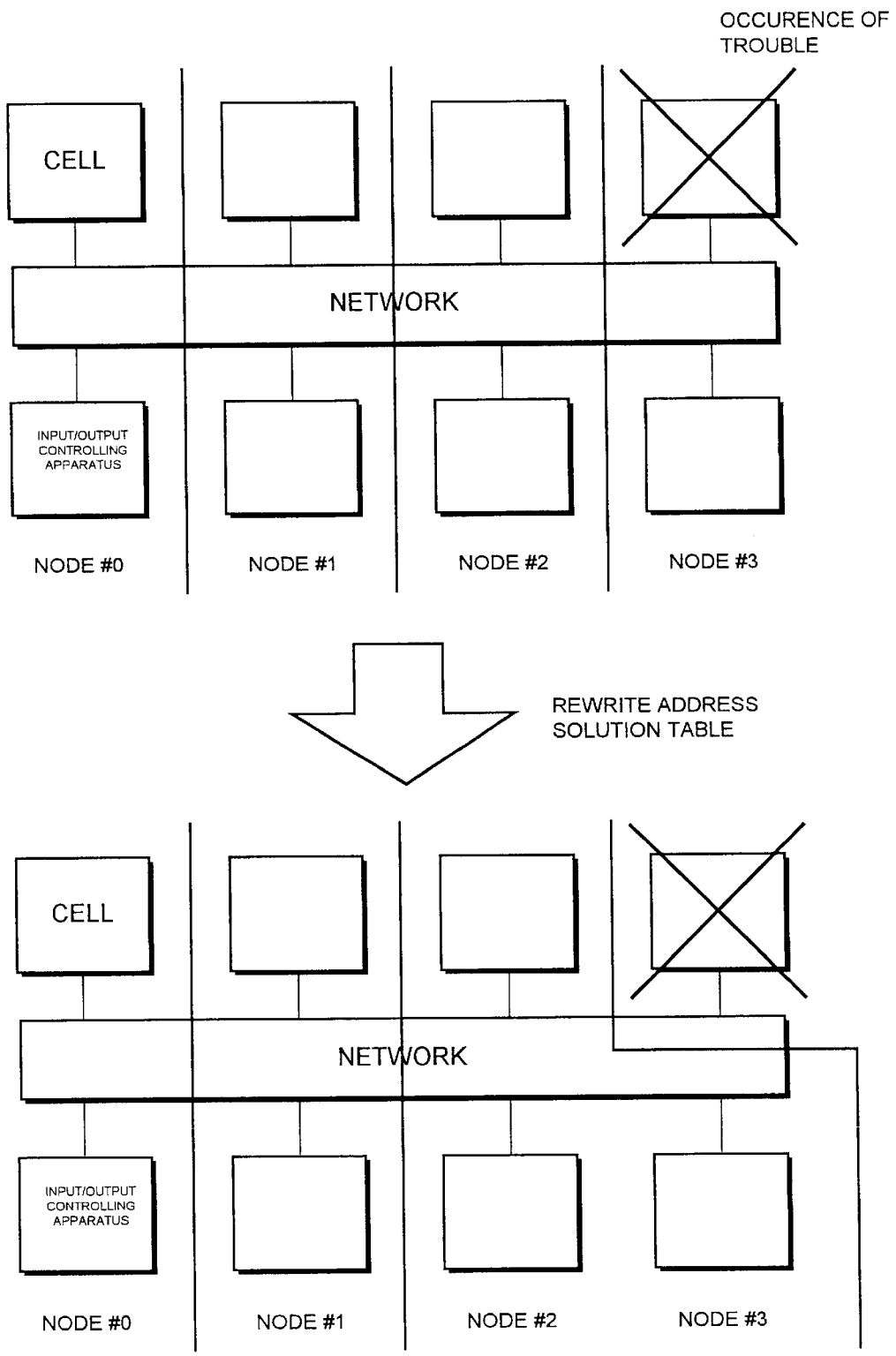
FIG. 15 is a view explaining the effect according to the second embodiment.

According to such a constitution, as shown in FIG. 15, even if a problem occurs in the cell of a certain node during the operation of cluster constitution, it is possible to separate only the cell with the problem and to apply the input/output controlling apparatus of the node with the problem to another node which is in normal operation.

Figure 16:
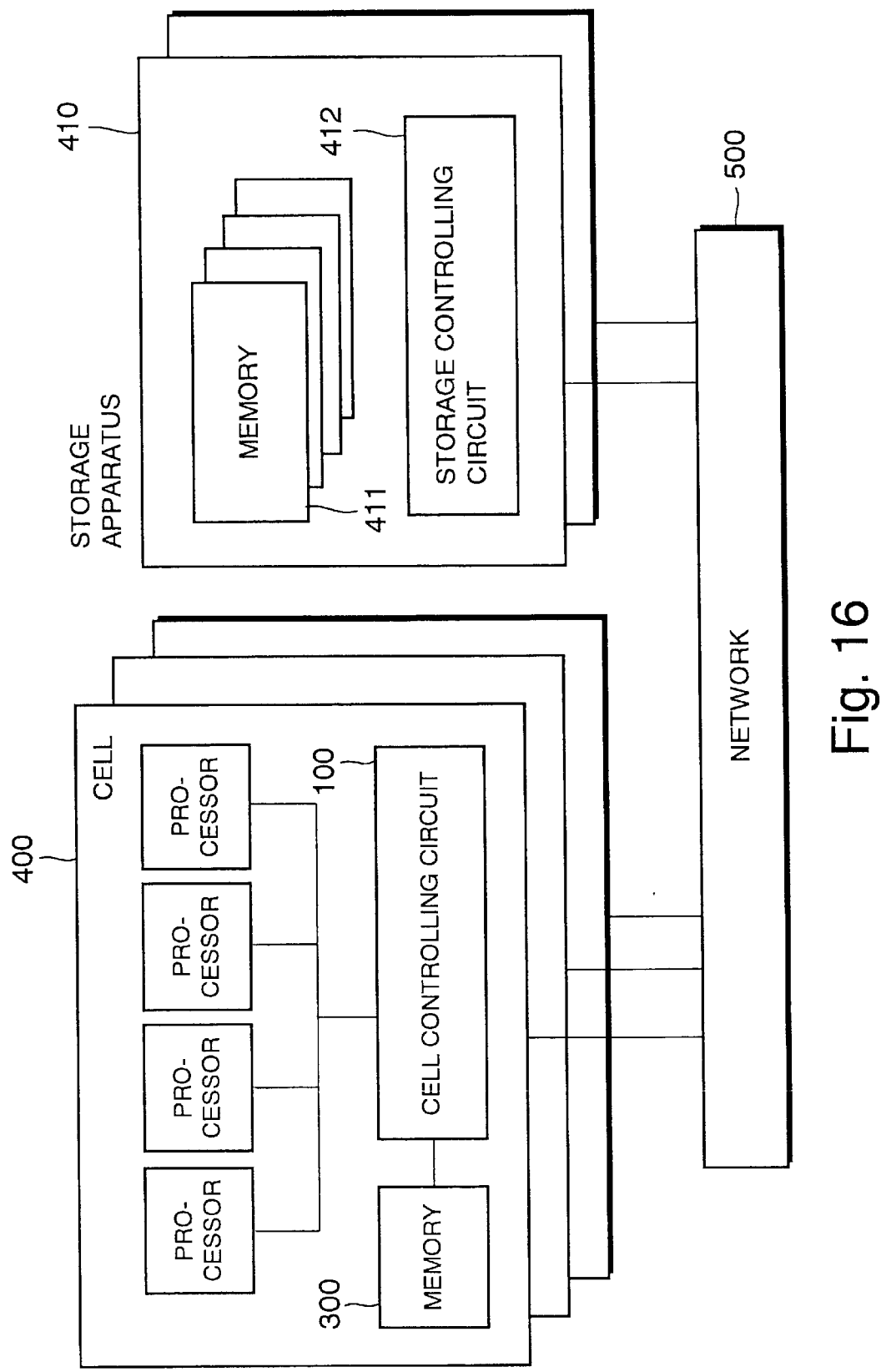
FIG. 16 is a block diagram showing the constitution of the third embodiment.
Figure 17:
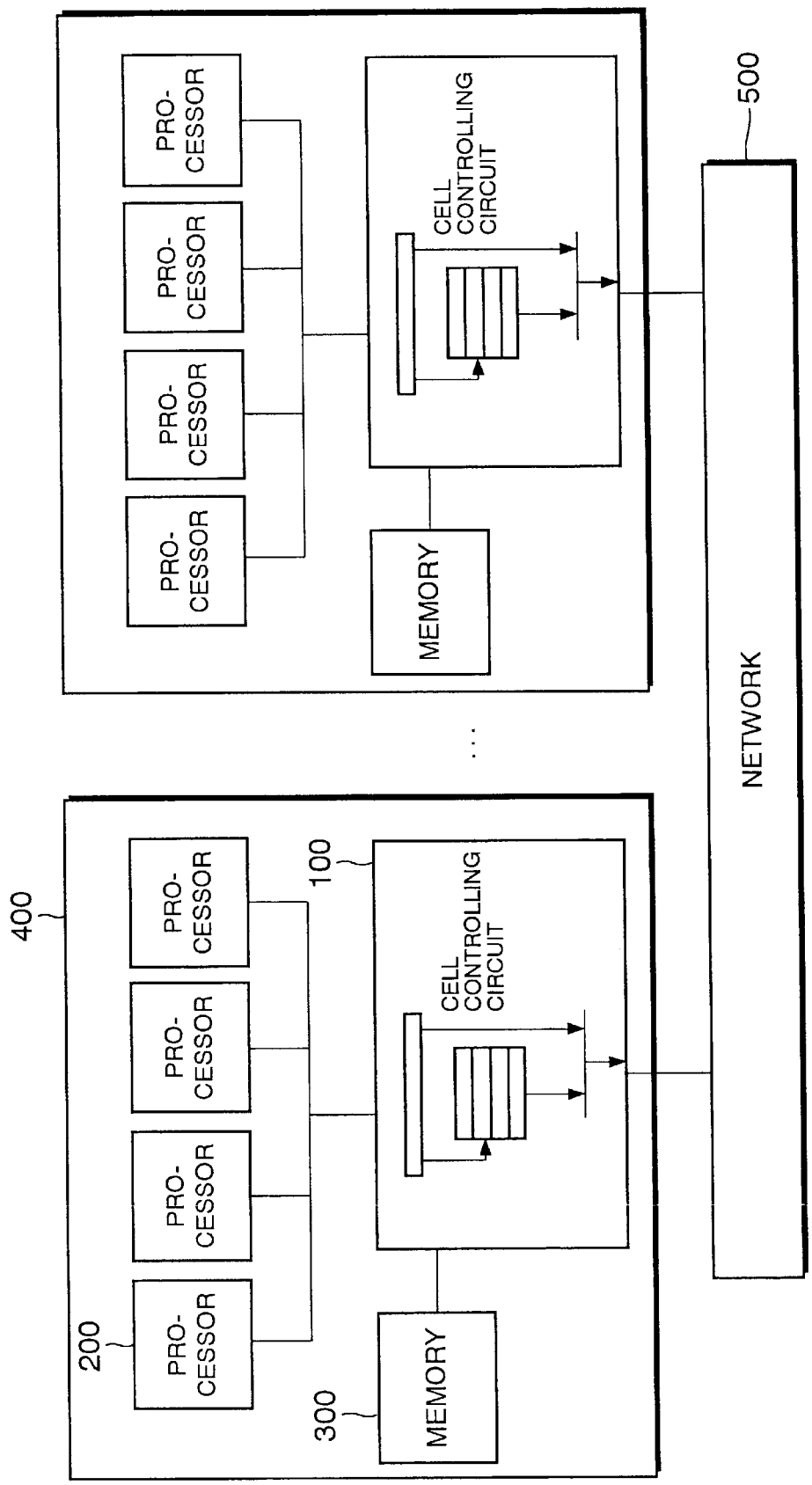
FIG. 17 is a view showing one example of the constitution of the conventional multiprocessor system.
Figure 18:
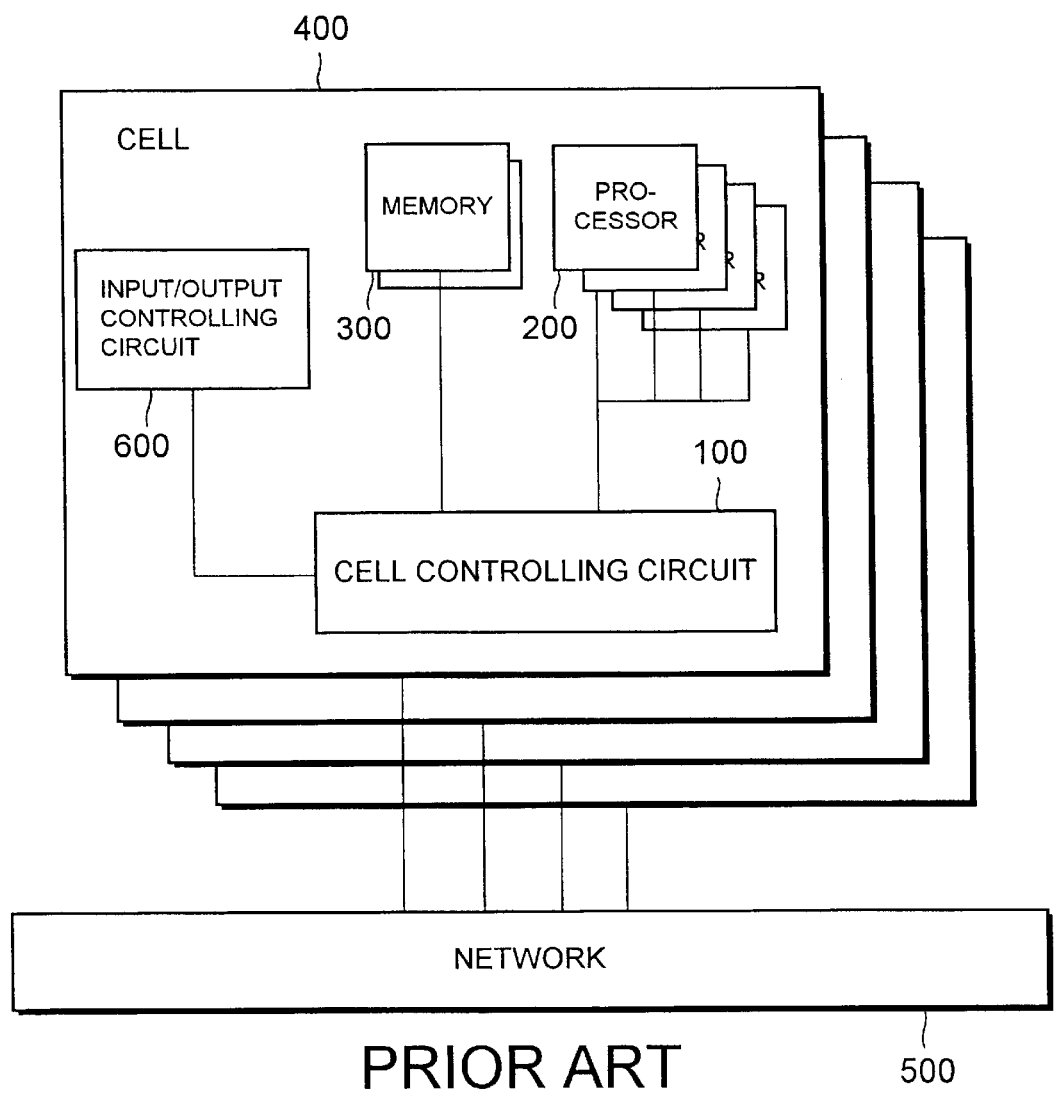
FIG. 18 is a view showing another example of the constitution of the conventional multiprocessor system.

In the multiprocessor system described above, all cells are constituted of the plurality of the processors 200, the memory 300 and the cell control circuit 100. However, as a third embodiment, it is possible to implement a part of cells as a storage apparatus 410 as shown in FIG. 16. The storage apparatus 410 includes a memory 411, and a storage controlling apparatus 412 that controls access to this memory 411. In this case, the storage apparatus 410 does not have to include the address solution mechanism by itself, and assignment of the memory in the storage apparatus 410 can be flexibly performed by setting the address solution table in the network 500.

Moreover, the above description showed the address solution table as an example of the address solution mechanism. However, only routine information that is necessary for forwarding access between the cells is required by an actual access resource as minimum information, and information that is necessary for specifying the memory location of a partner's cell may be provided at another location such as the partner's cell.

Thus, according to the embodiment of the present invention, by providing the address solution table 520, which corresponds to each cell, in the network 500, even a cell which has no address solution table packaged thereon can be used as a constitutional component of a node, so that the various memory constitutions in the multiprocessor system can be implemented.

As is obvious from the above description, even a cell which has no address solution mechanism packaged thereon can be used as a constitutional component, so that the multiprocessor system can be flexibly operated by the various memory constitutions.

Moreover, the present invention is not limited to a resource included in a node which constitutes a cluster, but a resource included in another node can be used.

Further, since the address solution tables are concentrated on the network, the setting becomes easy at the initializing time.

Furthermore, once the address solution tables of network are set, there is no need to set the tables later since no influence is exerted on the setting of each table even if the dynamic exchange of cells is performed later.

Although the preferred embodiments of the present invention have been described in detail, it should be understood that various changes, substitutions and alternations could be made therein without departing from spirit and scope of the inventions as defined by the appended claims.

What is claimed is:

1. A multiprocessor system, comprising:
   a plurality of cells, each cell including at least one processor and one memory module, said cells being connected to each other by a network,
   wherein said network includes address solution mechanisms corresponding to each of said cells, and
   each of said address solution mechanisms comprises an address solution table having a plurality of entries, each said entry relating an address to a corresponding cell number.

2. The multiprocessor system according to claim 1, wherein when a memory access is requested, said address solution mechanism retrieves said cell number from the address solution table by an address included in the access request, and accesses another said cell if the cell number retrieved from the address solution table identifies a cell other than the cell associated with the address solution mechanism.

3. The multiprocessor system according to claim 2, wherein each of said address solution mechanisms further comprises:
   a write protection flag which indicates whether or not write access from one of said cells other than the cell associated with the address solution mechanism is permitted,
   wherein said address solution mechanism indicates an access exception if said write protection flag indicates that write access from another said cell is unpermitted and a write access from another said cell is received.

4. The multiprocessor system according to claim 3, wherein each said entry of said address solution table further includes an inner cell identification number of the memory module relating to the corresponding address, the memory module included in said cell being identified by said inner cell identification number.

5. The multiprocessor system according to claim 3, wherein at least one entry of said address solution table holds the number of a said cell other than the corresponding cell.

6. The multiprocessor system according to claim 5, wherein said write protection flag is set to indicate that write access from another said cell is unpermitted.

7. The multiprocessor system according to claim 3, wherein one said cell number is set to at least one said entry in each said address solution table corresponding to at least two said cells.

8. The multiprocessor system according to claim 3, wherein each of said relative entries in said address solution tables has the same said cell number.

9. The multiprocessor system according to claim 3, wherein a part of each said cell is replaced by an input/output controlling apparatus.

10. The multiprocessor system according to claim 3, wherein a part of each said cell is replaced by a storage apparatus.

11. A network for a multiprocessor system which connects cells to one another, comprising:
    a plurality of cells, each including at least one processor, at least one memory module, and a cell controlling circuit which establishes connection between said processor and said memory module,
    wherein said network further comprises:
      an address solution table having a plurality of entries, each said entry including a number of a cell where the memory module relating to a corresponding address at each entry is located;
      means for retrieving information from said address solution table based on a requested address;
      a write protection flag for indicating whether or not write access to one said cell from another said cell is permitted; and
      for generating an access exception if said write protection flag indicates that write access from an outside cell is unpermitted and such access is requested.

12. The network according to claim 9, wherein each entry of said address solution table further includes an inner cell identification number of the memory module relating to the corresponding address, and the memory module included in said cell is identified by said inner cell identification number.

13. An address solution method, in which a multiprocessor system comprises a plurality of cells connected to each other by a network, each cell including at least one processor and one memory module, said network including an address solution table which holds a number of a said cell where a memory module relating to a corresponding address at each entry to be associated with each of said plurality of cells is located, said method comprising the steps of:
    retrieving information from said address solution table;
    determining whether or not a requested access is a write access from another said cell; and
    generating an access exception if a write from another said cell is unpermitted and said write access from another said cell is requested.

* * * * *